(12) United States Patent
Rubio et al.

(10) Patent No.: US 6,326,045 B1
(45) Date of Patent: Dec. 4, 2001

(54) METHOD FOR THE PRODUCTION OF PRECOOKED AND DEHULLED CORN FLOUR FOR AREPA AND TORTILLA

(76) Inventors: Manuel J. Rubio, 1621 Collins Ave., Miami Beach, FL (US) 33139; Roberto Contreras, R. Cortines 2002, Ote. Guadalupe, N.L. (MX)

( * ) Notice: Subject to any disclaimer, the term of this patent is extended or adjusted under 35 U.S.C. 154(b) by 0 days.

(21) Appl. No.: 09/764,279

(22) Filed: Jan. 19, 2001

(51) Int. Cl.[7] ........................................ A23L 1/00
(52) U.S. Cl. .................... 426/510; 426/463; 426/464; 426/511; 426/622
(58) Field of Search ........................ 426/506, 510, 426/511, 463, 464, 618, 622, 626, 482

(56) References Cited

U.S. PATENT DOCUMENTS 5,447,742 * 9/1995 Malvido et al. ................... 426/626
5,558,898 * 9/1996 Sunderland ........................ 426/626

* cited by examiner

Primary Examiner—George C. Yeung
(74) Attorney, Agent, or Firm—Young & Thompson

(57) ABSTRACT

Precooked and dehulled corn flour for arepa and tortilla is produced in a continuous process. First, the whole cleaned kernel is wetted and crushed to obtain two fractions. The fine fraction only is air-dried and sieved, while segregating both fractions through aspirations to isolate a floury-grit and hull fraction, incorporating the isolated fractions for animal feed by-product, and further producing an endosperm-germ fraction. The endosperm-germ fraction is conditioned and precooked fraction, cooled, air-dried and stabilized as to moisture content in the flaked material. It is then ground to particulate form, separating and collecting fine particles from coarse particles which are further processed, subjecting only the fine particles to centrifugation to yield an integral arepa flour, and, if desired, admixing the fine flour with lime to make a masa flour.

18 Claims, 1 Drawing Sheet

METHOD FOR THE PRODUCTION OF PRECOOKED AND DEHULLED CORN FLOUR FOR AREPA AND TORTILLA

BACKGROUND OF THE INVENTION

1. Field of the Invention

The present invention relates to a thermal-mechanical process for the manufacture of precooked and dehulled corn flour and, more particularly, relates to a continuous column-roller process applied to the production of instant corn flour for use in the preparation of arepa and tortilla and derivatives thereof.

2. Description of Related Art

Corn represents one of the most important cereal grains for the nutrition of the Latin American population. The amounts consumed, as well as the form of consumption, are quite variable among different countries in the region. In Mexico and some Central American countries, the grain is transformed into food products by a unique process known as "nixtamalization", which basically consists of the alkaline cooking of whole corn kernel and breaking of the hull (or pericarp) down toward a partially gelatinized state (U.S. Pat. No. 4,513,018). Afterwards, the cooked corn is washed, ground and dried to give corn masa flour for different product applications. The main edible product of the traditional process is the "tortilla" which is a flat, round, unfermented and baked thin pancake produced from lime-cooked maize.

In the northern part of South America, particularly in Colombia and Venezuela, hard endosperm corn is processed with dry milling technology and it is further converted into a precooked flour for traditional maize foods. Its consumption is mainly in the form of "arepa" which is a flat, unleavened and baked thick pancake made from dehulled and degermed cooked-maize. In other South American countries, corn meal and corn flour are used for different bakery and pancake mixes as well as snack products.

At the present time, there is a large expansion in the consumption of corn products in the U.S.A. and tortilla is one raw material for the preparation of snack and traditional "Tex-Mex" dishes. Thus, there is an increasing demand and use of industrially prepared corn flours so they can provided benefits to the consumer, such as convenience, availability, price and a more stable quality. The potential market for masa flours in the U.S.A., Mexico and Central America is estimated at 17.8 million tons per year based on an average annual per capita consumption of 122 kilogram (tortilla and snacks: Sustain, 1997).

In the production of corn products, such as tortillas, chips and the like, from food grade corn, it is known that the hard endosperm corn (U.S. Pat. No. 2: USFGC, 1996) must be partially cooked before it is formed into the end product, so as to cause it to be a partially gelatinized corn flour. In the past, this has been done by processes wherein the corn is cooked and/or steeped in a lime-water solution (traditional nixtamalization) such as those disclosed in U.S. Pat. Nos. 2,584,893 (Lloyd et al.), 3,194,664 (Eytinge) and 4,326,455 and 4,513,018 (Rubio), and subsequently ground and dried to produce nixtamalized corn flour (masa flour) from which such corn products may be made. As it may be seen from the above, the prior art methods for the industrial production of corn dough or masa flour involve accelerated cooking times with large amounts of processing water and increased costs for water removal. The lime-cooking changes produced in the hull or pericarp fraction are connected with the hydrolysis and solubilization which releases a highly hydrated dietary fiber having a marked effect on the rheological and mechanical characteristics of the traditional dough and its tortilla. Furthermore, the lime-water residue ("nejayote") is composed of 2.2 to 2.8% total solids from a continuous cooker which included 64–76% dietary fiber, 12–20% starch and 1.4% protein. The raw corn quality, cooking-time profile and process-type (Alvarez and Ramirez, 1995) utilized have been proposed as the main variables which determine corn solid losses in nejayote.

With the aim of solving the above described problems by the traditional and/or industrial processes, some workers have developed alkaline-cooking methods with extruders. In this connection reference is made to the following U.S. Pat. Nos: Rubio 4,250,802, Martinez-Bustos et al. 5,532,013 and Bazua et al. (1979). Although the above-described prior art provides means for rendering grain, such as corn or dehulled corn, into corn dough and/or masa flour under process conditions involving reduced amounts of water with shortened processing times, an industrial extruder capable of producing such a corn dough or masa flour was still unavailable in the market.

In view of the limitations of the prior art accelerated methods for alkaline-cooking (thermal process) and alkaline-extrusion (thermal-mechanical process) for producing instant masa flour, they are not yet suitable for obtaining a corn flour with "different degrees of starch gelatinization" during precooking of the corn endosperm. In accelerated alkaline-cooking with simultaneous "impact grinding and flash drying processes", the peripheral zone of the endosperm might present starch gelatinization and, while this permits an increase in water adsorption (dough yield) during preparation of the dough, it may also facilitate water evaporation (dehydration) during tortilla cooking, whereby the mechanical properties are negatively affected by hardening or staling of the tortilla without texture additive.

In view of the above, Wimmer et al. in U.S. Pat. No. 3,404,986 proposed a mechanical method for separating germ, endosperm and hull (pericarp) of the corn kernel and then prepared mixtures of moisturized standard corn meal and degerminated meal or flour (containing 18 to 35% moisture) and subjected it to the action of heated rotating rolls to cause controlled starch gelatinization (precooking) with subsequent drying and grinding to produce a corn flour. This instant corn flour can be used for a reduced fat snack and may be used in tortilla preparation. Hart, in U.S. Pat. No. 4,329,371, describes a hybrid method without the use of alkali-cooking, by providing a step of dehulling the corn grains with a dehusking apparatus, separating the hull from the endosperm and germ fractions, using the hull for other low-value applications, and cooking the endosperm and germ fractions with steam. This cooked-dehulled fraction is then dried and ground to produce a corn flour for tortilla.

Vaqueiro et al., in U.S. Pat. No. 4,594,260, discloses another hybrid method of obtaining corn flour which essentially comprises removing the hull from the germ and endosperm of the corn kernel until a hull-containing fraction and an endosperm-germ-containing fraction are produced and then nixtamalizing by the traditional method only the hull fraction and remixing the same with the uncooked endosperm-germ fraction (containing 30 to 35% moisture). This moisturized mixture is ground and dried to obtain an instant corn masa flour used in producing tortilla. Herbster, in U.S. Pat. No. 5,176,931, defines a short-time, low-pollution hybrid method of preparing masa flour for making tortilla chips. This procedure preferably comprises subjecting alkali-treated debranned and moisturized corn (15 to 35%) to near infrared radiation in order to partially cook the dehulled grain. The precooked-dehulled fraction can be additionally cooked, cooled and milled to desired particle size similar to industrial masa flour (Masa mixta brand) having 55% of non-gelantinized starch granules, 25% partially gelatinized and 20% fully gelatinized (according to microscopic examination).

According to Watson (1987), the corn hull or pericarp (bran) makes up 5–6% of the kernel dry weight. In reference to the value-enhanced corn report (USFGC, 1996), a white-hard-endosperm kernel may contain: 11.5–11% moisture, 72.2–73.2% starch, 10.5–9.8% protein, 4–3.7% fat, and 2.1–2.3% of ash and crude fiber. Furthermore a dry-milled sample might yield, on a dry weight basis, 76.2–74.8% of total endosperm, 18.9–20.5% of germ and 4.9–4.8% of pericarp. A typical materials balance for a Venezuelan arepa plant can yield a minimum of 65% flour on a wet basis (Cuevas, 1985). By 1993, a whole or integral arepa flour was produced with more fiber and less protein and fat as compared to the traditional degermed flour which is enriched by Venezuelan law with vitamins (B and A) and iron.

cessed to render from them a desired particle size; subjecting only the fine grind to a high speed centrifugation to further control of filth material for arepa flour and to admixing with lime to produce masa flour for tortilla and the like.

BRIEF DESCRIPTION OF THE DRAWINGS

This invention may be understood from the description which follows of preferred embodiments when read with the accompanying drawing in which.

DETAILED DESCRIPTION OF PREFERRED EMBODIMENTS

Figure 1:
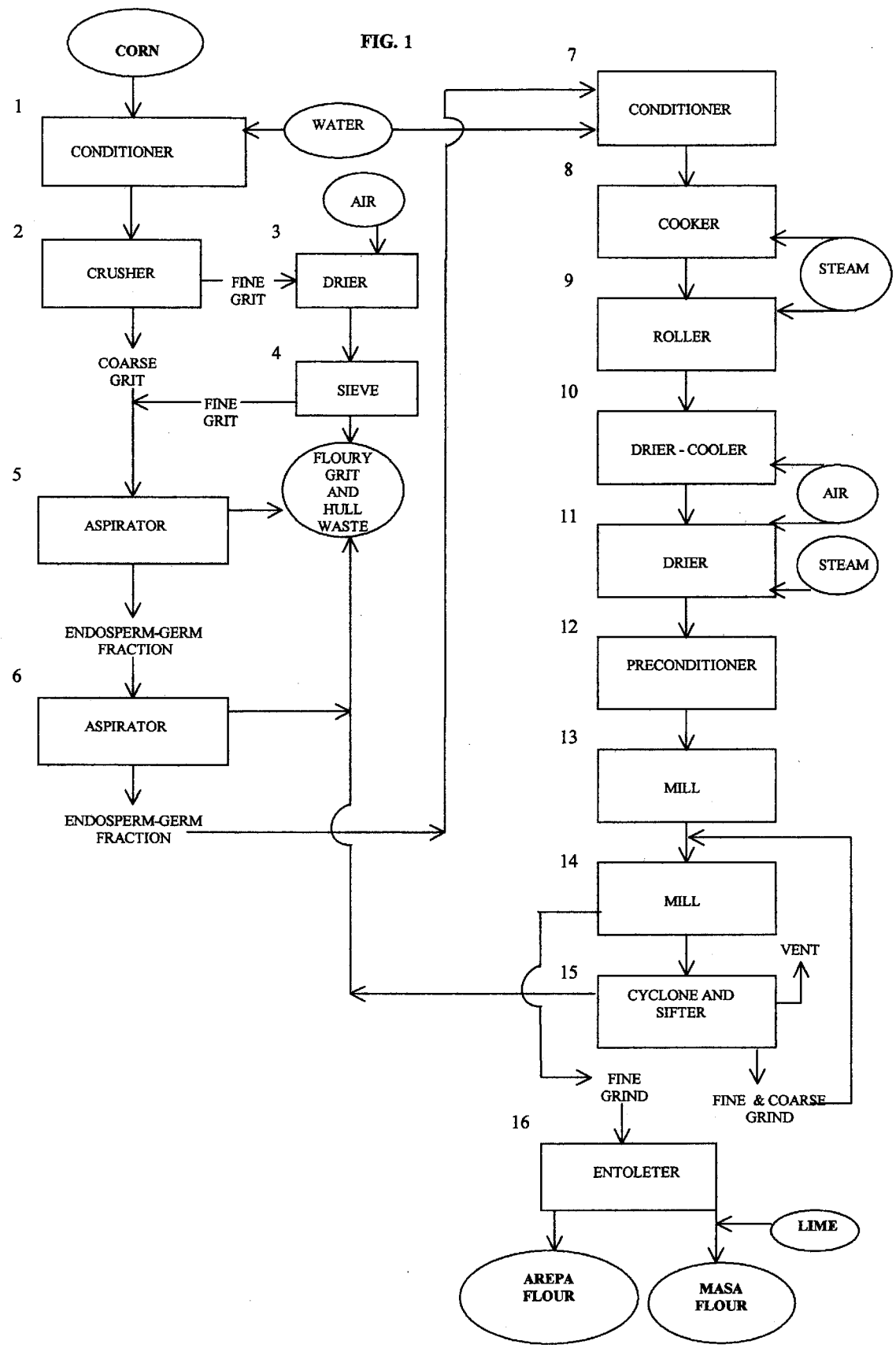
FIG. 1 is a schematic flow sheet of an embodiment in accordance with the present invention.

Referring first to FIG. 1, there is depicted, in flow diagram form, an embodiment of the present invention. It includes a conditioner 1; a crusher 2; a drier 3; a sieve 4; a primary aspirator 5; a secondary aspirator 6; a conditioner 7; a cooker 8; a roller 9; a drier-cooler 10; a drier 11; a preconditioner Fiber Components of Corn Kernel Parts

| Part | % Dry Matter | Fiber Insol. | Hemicellulose | Cellulose | Lignin | Fiber Soluble | Fiber Total | % Kernel Fiber |
|---|---|---|---|---|---|---|---|---|
| Whole Kernel | 100 | 9.5 | 6.7 | 3 | 0.2 | 0.1 | 9.5 | 100 |
| Starch endosperm | 80.9 | 1.0 | — | — | — | 0.5 | 1.5 | 12 |
| Aleurone endosperm | 2.0 | 50.0 | — | — | — | 25.0 | 75.0 | 15 |
| Germ | 11.0 | 11.0 | 18 | 7 | 1.0 | 3.0 | 14.0 | 16 |
| Pericarp (bran) | 5.3 | 90.0 | 67 | 23 | 0.1 | 0.6 | 90.7 | 51 |
| Tip cap | 0.8 | 95.0 | 70 | — | 2.0 | — | 95.0 | 6 |

SUMMARY AND OBJECTS OF THE INVENTION

Accordingly, it is an object of this invention to provide a complete departure from the prior art precooking methods of thermal and mechanical processing of dehulled corn in order to control starch gelatinization during production of instant corn flour for arepa and tortilla and derivatives thereof.

Another object is to produce this instant corn flour utilizing a continuous precooking process which is not only efficient but also less expensive than prior art accelerated methods for producing masa flour.

Still another object is to produce instant corn flour for arepa and tortilla wherein such flour is relatively uniform and homogeneous in its physical and chemical properties.

The above and other objects and advantages of the invention are achieved by a new continuous process applied to the production of precooked and dehulled corn flour or instant corn flour for arepa and tortilla, embodiments of which comprise the steps of: wetting the whole cleaned kernel to condition the same; crushing the wetted kernel to produce fine and coarse fractions; air-drying and classifying the fine fraction; separating from both fractions a floury grit and hull fraction as a corn by-product; conditioning the dehulled fraction to partially hydrate the starchy endosperm; precooking the conditioned material in a column with steam injection and further roller flaking to obtain a desired degree of gelatinization; cooling, air-drying and stabilizing the flaked material moisture to a desired optimum level for grinding; grinding the dried flake in a series of primary and secondary mills and producing air-suspandable particles; separating and recovering the fine particles so produced from the coarse particles while the latter are further pro- 12; a primary mill 13; a series of secondary mills 14; a cyclone with an associated sifter 15; and an entoleter 16.

Whole corn kernel, which has been freed of foreign material, is fed to a conditioner 1, where the corn is sprayed with water to wet the hull and germ fractions. The wet kernel is passed through a crusher 2, which breaks the hull loose from the kernel, tears out the germ, and coarsely grinds the endosperm into two fractions.

The large portion of corn endosperm is known as the coarse grit fraction (or "flaking grits"), while the small portion is described as the fine grit fraction composed of endosperm, germ and hull which is also known as "through stock or standard meal".

The fine grit thus obtained is next directed to an air-drier 3, which reduces the moisture content of the ground fine mixture to about 9–11%, similar to the incoming whole corn, depending on the kernel hardness and its granulation being produced.

The dried fine grit is further conveyed to a sieve 4, wherein two fractions are obtained, the floury grit with a softened hull fraction (containing from 10%–12% moisture) which is removed and sold as corn by-product, and the fine grit which is thereafter fed to the primary aspirator 5, together with the coarse fraction directly obtained from the crusher 2.

The density separation steps which are performed in both primary 5 and secondary aspirator 6, each produce two fractions in a series of operations. The floury grit and hull fraction segregated by aspirators 5 and 6 is isolated as corn by-product, and the dehulled fraction is conveyed to a conditioner 7 (representing from about 80% to 85% of the total weight incoming corn).

The dehulled or endosperm-germ fraction is thereafter subjected to a tempering step in conditioner 7, wherein this fraction is sprayed with water in order to partially hydrate from 9% to 12% to about 20% to 22% for a period of about 20 to 30 minutes. After completing the conditioning step, the moisturized material is transferred to a cooker 8, wherein a partial gelatinization or precooking is performed through a column with the addition of live steam at the bottom end (70 to 98 psi and 154° to 162° C.) in order to precook for a period of from about 40 to about 100 minutes. The main degree of partial starch gelatinization is further controlled by passage of the precooked material between closely adjusted heated rotating steel drums or rollers 9. They are heated internally with saturated steam (450 to 500 psi and 210° to 240° C.) so precooking is closely controlled by roll pressure, roll temperature, separation and speed variables which govern the material residence time. Any granular material is squeezed to form precooked flakes with an additional partial gelatinization at a temperature between 88° and about 93° C. having a moisture content between 17% and about 19%.

The precooked flake is thereafter passed through a drier-cooler 10, whereby an adiabatic drying with atmospheric air allows the moisture content of the material to be adjusted to about 14% and 17%, depending on the flake granulation and its incoming temperature (55° to 60° C.). The cooled flake is discharged into a drier 11, wherein the material is further reduced to a moisture content of about 10% to 12% by steam-tube drying (45 to 60 psi and 135° C. to 145° C.) and incoming air for a period of time of from about 2 to about 5 minutes. The dried flake is then passed to a preconditioner 12, where the flake moisture is further stabilized between 30 and about 90 minutes transit time and further enhancing the grinding which is to follow because the moisture is more nearly uniform.

The stabilized flake thus obtained is thereafter ground in a primary mill 13, wherein a coarse grind is obtained by a roller mill from which the premilled flake mixture is passed to a series of secondary mills 14. The premilled flake is further fed to a series of four secondary roller mills 14, where the material is reduced to a coarse and fine grind which are further conveyed by a pneumatic pipe system to a cyclone and sifter 15. The grind material thus obtained is fed to a cyclone and sifter 15, whereby three different fractions are obtained, namely, a light floury-hull which is segregated in the cyclone whose design is know per se and discarded as corn by-product, a fine grind which is directly fed to a single secondary roller mill 14, and a third coarse grind which is thereafter reprocessed in a series of three secondary roller mills 14.

The fine grind which is obtained from a single secondary roller-mill 14, is further centrifuged in an entoleter 16, whereby two fractions are produced, namely, a light filth material, and a heavy fine flour which is known as instant corn flour for arepa.

In this method, arepa flour is produced in a 80% to 85% yield per kilogram of corn kernel. There is an improved yield gain from 15% to 20% of the total corn weight as compared to the typical arepa process which yields from 65% to 70%.

Furthermore, and surprisingly, this method produces an arepa flour having higher protein content (by 10% to 20%), fat content (by 50% to 100%) and fiber content (about 100% higher) than dehulled and degermed corn flour for arepa and the like produced by conventional methods.

Finally, this centrifugated fine thus obtained from an entoleter 16, may be admixed with lime (0.3% weight, based on flour) from which an instant masa flour is also produced (U.S. Pat. No. 3,730,732).

From the foregoing, it will be clear that it is possible to manufacture a precooked and dehulled corn flour or an instant masa flour for arepa and tortilla with a new continuous process which is highly efficient because of the minimum use of water, which in turn makes the grinding process more uniform, and avoids expensive costs of removing the water and wasted corn solids that would have been present but for the features of this invention.

It is to be understood that the embodiments of this invention herein illustrated and described, are by way of illustration and not of limitation, and that other embodiments may be made by those skilled in the art without departing from the spirit or scope of this invention.

References

U.S. PATENT DOCUMENTS

| | |
|---|---|
| 2,584,893 | 2/1952 Lloyd et al. |
| 3,194,664 | 7/1965 Eytinge |
| 3,404,986 | 10/1968 Wimmer et al. |
| 3,730,732 | 5/1973 Rubio |
| 4,250,802 | 2/1981 Rubio |
| 4,326,455 | / 1982 Rubio |
| 4,329,371 | / 1982 Hart |
| 4,513,018 | 4/1985 Rubio |
| 4,594,260 | 6/1986 Vaqueiro et al. |
| 5,176,931 | 1/1993 Herbster |
| 5,532,013 | 7/1996 Martinez-Bustos et al. |

OTHER PUBLICATIONS

Alvarez, M.M. and Ramirez, J. F. 1995. Biodegradative treatment of nixtamalization waters (nejayote). Abstract in Keystone Symposia of Environmental Biotechnology (Journal of Cellular Biochemistry), Silverthorne, Col, USA.

Bazua, C.D., Guerra, R. and Sterner, H. 1979. Extruded corn flour as an alternative to lime-heated corn flour for tortilla preparation. Journal of Food Science. 44:940.

Cuevas, R., Figueira, E. and Racca, E. 1985. The technology for Industrial production of Precooked Corn Flour in Venezuela. Cereal Foods World. 30(10): 707–712.

Sustain, 1997. A literature and Industry Experience Review, In: Fortification of corn masa flour with Iron and/or other Nutrients, By: Bressani, R., Rooney, L. W. and Serna-Saldivar, S. O. USAID, Wash., D.C., December (165 p.)

USFGC, 1996. USFGC releases value-enhanced corn report. Feed and Grain, October/November pp: 16–20.

Watson, S. A. 1987. Structure and Composition, In: *Corn Chemistry and Technology* Eds. S. A. Watson and P. E. Ramsted, AACC, St. Paul, Minn., USA, pp. 53–78.

We claim:

1. A method for continuously making precooked and dehulled arepa flour from cleaned corn kernel, comprising continuously and repeatedly performing the following steps:
   conditioning whole corn kernel, by washing with sprayed water to wet hull and germ fractions thereof,
   crushing said whole corn kernel by breaking hull portions loose therefrom and milling the crushed kernel into first and second fractions,
   air-drying and classifying said first fraction to remove therefrom a first floury grit and hull fraction as a by-produce,
   aspirating said second fraction to remove therefrom a second floury grit and hull fraction, and mixing the first and second floury grit and hull fractions as a combined by-product, while producing an endosperm-germ fraction, conditioning the endosperm-germ fraction to partially hydrate starchy endosperm thereof, precooking the conditioned endosperm-germ fraction in a steam column-cooker and further cooking in a roller to effect a controlled partial gelatinization, cooling the cooked endosperm-germ fraction in an adiabatic drier to produce a flake material, and air-drying and stabilizing the flake material to a desired moisture, grinding the dried flake material in a series of primary and secondary roller mills, separating and collecting a resulting fine grind from a resulting coarse grind while the coarse grind is further processed, and subjecting only the fine grind to a centrifugation in an entoleter to isolate a light filth material and to produce an integral arepa flour.

2. The method of claim 1, further comprising admixing lime with said integral arepa flour, to produce a masa flour.

3. The method of claim 1 wherein said arepa flour is produced in a 80% to 85% yield per kilogram of corn kernel.

4. The method of claim 1 wherein said crushing of the cleaned and conditioned kernel is carried out with an abrading mill producing a coarse and a fine fraction.

5. The method of claim 4 wherein said first fraction is dried while removing moisture therefrom to a content of about 9% to 11% and further sieving of said fraction to isolate a flour grit and hull fraction as a corn by-product.

6. The method in accordance with claim 4 wherein said endosperm-germ fraction is further removed through a series of aspirators to isolate a floury grit and hull fraction as an animal-feed, representing from 15% to about 20% of the total weight of corn kernel.

7. The method in accordance with claim 5 wherein said endosperm-germ fraction is further removed through a series of aspirators to isolate a floury grit and hull fraction as an animal-feed, representing from 15% to about 20% of the total weight of corn kernel.

8. The method according to claim 6 wherein said dehulled fraction is tempered by spraying water until reaching a moisture of about 21%, for about 20 to 30 minutes.

9. The method in accordance to claim 8 wherein said conditioned fraction is partially precooked in two steps:
   a) with steam-injection in a column-cooker at a steam temperature of about 154° C. to 162° C. and for 40 to 100 minutes, and
   b) with controlled roll pressure and steam temperature.

10. The method according to claim 9 wherein said precooked flake is air-dried in two steps;
   a) adiabatic drying or cooling said flake while removing moisture therefrom from about 18% to 15%, and
   b) steam-tube drying to decrease the flake moisture from about 15% to about 11% at a steam temperature of about 135° to 145° C., for a time of 2 to 5 minutes.

11. The method according to claim 10 wherein said dried flake is ground in a primary and secondary roller mill and segregated under 30 to 60 mesh depending on a desired arepa flour or end product.

12. The material according to claim 11 wherein said fine grind is centrifuged in an entoleter for producing an arepa flour and admixed with lime for a masa flour (0.3% weight based on arepa flour).

13. The method according to claim 12 wherein said arepa flour is rehydrated by mixing with warm water from a ratio of about 1:1.3 to about 1:1.4 weight ratio for a corn dough used in arepa preparation.

14. The method according to claim 12 said masa flour is rehydrated by mixing with water from a 1:1 to about 1:1.3 ratio for a masa dough used for tortilla elaboration.

15. The method of claim 9, wherein the roll pressure during the precooking is in the range of 450 to 500 psi.

16. The method of claim 15, wherein the steam temperature during the precooking is between 210° C. and 240° C.

17. The method of claim 13, wherein the corn dough used in arepa preparation has a final moisture content between 53% and 60%.

18. The method of claim 14, wherein the masa dough used for tortilla elaboration has a final moisture content between 45% and 49%.

* * * * *